United States Patent [19]

Thompson

[11] 4,232,744
[45] Nov. 11, 1980

[54] DIGGER-SHAKER-INVERTER APPARATUS

[75] Inventor: Jack E. Thompson, Chula, Ga.

[73] Assignee: Lilliston Corporation, Albany, Ga.

[21] Appl. No.: 784,264

[22] Filed: Apr. 4, 1977

Related U.S. Application Data

[63] Continuation of Ser. No. 616,178, Sep. 24, 1975, abandoned.

[51] Int. Cl.³ ............................................. A01D 29/00
[52] U.S. Cl. ................................................... 171/101
[58] Field of Search ................... 171/101, 116, 44, 18, 171/138, 61, 62; 214/83

[56] References Cited

U.S. PATENT DOCUMENTS

| 2,999,547 | 9/1961 | Long | 171/101 |
|---|---|---|---|
| 3,454,100 | 7/1969 | Lilley | 171/116 |
| 3,847,225 | 11/1974 | Whitfield et al. | 171/101 |

Primary Examiner—Jay N. Eskovitz
Attorney, Agent, or Firm—Newton, Hopkins & Ormsby

[57] ABSTRACT

The inverter section of a peanut digger-shaker-inverter comprises two downwardly and inwardly inclined squirrel cage reels and associated inverting tine sets. Each reel includes spaced discs having undulating peripheries and adjacent pairs of the tines have portions straddling a disc and curving similarly thereto opposite the valleys of the undulations so that peanut plants are bumped and agitated, and thereby cleaned, while being fed along and supported by these portions of the tines.

6 Claims, 5 Drawing Figures

DIGGER-SHAKER-INVERTER APPARATUS

This is a continuation of application Ser. No. 616,178, filed Sept. 24, 1975 now abandoned.

BACKGROUND OF THE INVENTION

In recent years, considerable effort has been expended with respect to the development of agricultural machines which dig and distribute peanut plants on a field in windrows so that the crop may be cured or dried prior to further processing as by a peanut combine. In particular, various techniques for causing the peanut plants to be deposited in inverted condition in windrows have been developed in machines known as digger-shaker-inverter machines. Such machines first dig the peanut plants by severing the root system below the peanut pods, subject the plants to a shaking action to remove the soil and then turn the plants upside down in a window so that foliage supports the peanut pods in uppermost, exposed condition. The chief advantages of inverting the plants are that it promotes faster and more uniform drying of the peanut pods, reduces time in the windrow so that there is less risk of damage from inclement weather, minimizes damage to the peanuts if rain does occur during windrow drying, provides a less favorable environment for mold formation during the windrow period, promotes cooler kernel temperatures as compared with peanut pods in contact with the soil, and lessens harvesting field losses.

However, as with any machine, digger-shaker-inverters are not entirely free from disadvantages or problems. In these machines, two basic approaches to accomplish the inversion are employed. One approach involves grasping the tops or foliage of the plants and turning them upside down in a positive manner whereas the other basic approach involves elevating the plants and then constraining them to roll over as they fall under the influence of gravity. Regardless of the approach employed, variations in the type of soil and in soil conditions such as moisture content, and the presence of weeds or grass can create problems.

For example, when the inverting devices involve mechanism with fingers or other protrusions or teeth with which foilage can easily become entangled, the problem of binding up or clogging can easily occur particularly if there are large amounts of weeds or grass intermingled with the root crop. Further, the soil will cling to the plant roots more or less depending upon the moisture content and type of the soil. Consequently, under some circumstances the plants will be cleaned sufficiently in the usual shaker section of the machine whereas in other cases they will not be cleaned sufficiently in this section of the machine. The inverting section of the machine may or may not appreciably augment the cleaning action and there is always the danger that the shaking, agitating or other cleaning action may be too violent such as tends to shake the peanuts loose from the plant, allowing them to drop back onto the field where they have no chance of recovery.

BRIEF SUMMARY OF THE INVENTION

Accordingly, it is of primary concern in connection with the present invention to provide an improved type of digger-shaker-inverter wherein the inverter section is fully effective to achieve its inverting function while, at the same time, it contributes materially to the shaking or cleaning action but does so without the danger of materially increasing the number of peanuts which will be lost in the harvesting operation.

Basically, the present invention is directed to digger-shaker-inverters of the type generally exemplified by U.S. Pat. Nos. 2,669,820, 2,722,794, 3,473,615, 3,726,345, 3,625,291 and 3,847,225. In particular, the present invention is directed to an improved form of inverter mechanism which includes open, reel-like structures in association with tine sets wherein the reel-like structures readily permit the passage of removed soil therethrough and which are particularly constructed and detailed in design to cooperate with certain portions of the tine sets to effect a bumping and shaking action on the dug plant while conveying them along the tine sets for inversion whereby an extended shaking or cleaning action is effected in a very efficient manner so that the action does not tend significantly to increase the amount of peanuts which are separated from the plants and thus lost to the harvesting operation.

Accordingly, it is of primary concern in connection with the present invention to provide a root crop harvesting apparatus which is operable for digging root crops from their growing implacement in the ground, orienting the plants in an inverted position with the root crop portion located above the plant or foliage portion and removing soil from the plants in the process. Specifically, it is an object of the present invention to provide a root crop harvesting apparatus which is operable for digging root crops from a pair of adjacent rows thereof, forming the root crops from the two rows into a compact windrow located between the two dug rows and simultaneously inverting the root crop in the windrow forming operation and for achieving such an effective cleaning or shaking action throughout this process as will more efficiently clean the plants without effecting such violent action thereon as will be detrimental to the harvesting operation.

BRIEF DESCRIPTION OF THE DRAWING FIGURES

DETAILED DESCRIPTION OF THE INVENTION

Figure 1:
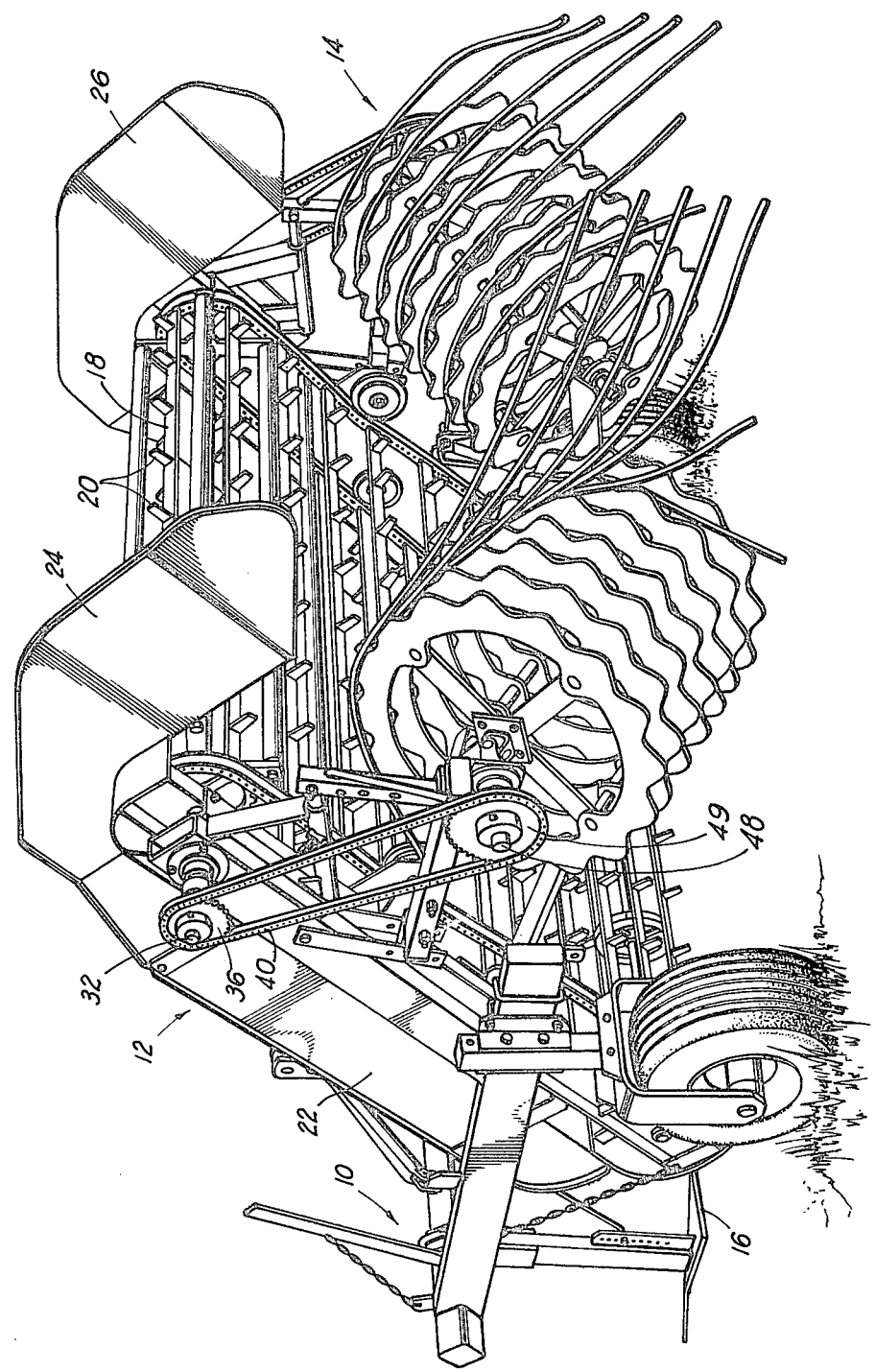
FIG. 1 is a rear perspective view showing a machine according to this invention.

In the apparatus shown in FIG. 1, the digger-shaker-inverter shown therein includes the three essential sections for performing the requisite functions, namely, the digger section indicated generally by the reference character 10 and disposed at the forward end of the apparatus, the conveying means indicated generally by the reference character 12 and the inverting means indicated generally by the reference character 14 disposed at the rearward end of the apparatus. The digging means and the conveying means may be of entirely conventional configuration and construction such as is disclosed for example in U.S. Pat. No. 3,726,345, the details of which are incorporated herein by reference thereto. For the purpose of this description, suffice it to say that the digging means 10 includes cutters such as the cutter 16 which are adapted to operate subterraneously to sever the tap root system of the peanut plants below the peanut pod clusters thereof and may additionally include colter discs and the like for severing the root systems laterally to either side of a crop row so as allow two adjacent rows of the peanut plants to be dug up and removed from their ground implantation whereafter they are picked up by the conveying and shaking means 12 so that the two rows of dug plants are elevated in upwardly inclined paths to elevated, rearward or discharge end of conveying means 12 whereupon the two rows of plants fall by gravity onto respective assemblies hereinafter described which form the inverting means 14.

The conveying means 12 is of open framework configuration and construction and includes conveyor slats such as those indicated by reference character 18 and having teeth 20 thereon and which are joined in endless fashion to elevate the two rows of dug crop and to in the process, impart a shaking or cleaning action thereon so that clods of dirt and debris in general clinging to the root system will fall by gravity through the open construction of the conveying means 12 to reach the ground surface.

The two rows of crops which are dug and picked up by the conveying means 12 are deposited on the latter adjacent the opposite sides thereof and thus drop from the conveyor means 12 in the region immediately above the two reel and tine assemblies which form the inverting means 14. The conveying means 12 is provided with opposite side boards such as the side boards 22 and rearward extensions 24 and 26 thereof to assure that the plant rows are directed properly onto the reel and tine assemblies. The endless conveyor mechanism of the conveying means 12 is positively driven as by means of the belt 28 and associated pulley 30 which imparts drive to the upper shaft 32 as is shown more clearly in FIG. 2. The upper shaft 32 of the conveying means 12 is extended beyond the opposite sides of the machine as will be evident from FIGS. 1 and 2 and each extended end thereof carries a sprocket 34 or 36 over which the respective chains 38 and 40 are trained. These chains respectively are engaged with the further sprockets 42 and 44 which are affixed to the respective stub shafts 46 and 48 for imparting drive to the respective reel assemblies hereinafter described more particularly. As will be evident more particularly from FIGS. 2 and 3, the stub shafts 46 and 48 are rotatably journalled in frame members 50 which are attached at their forward ends to the respective brackets or hangers 54 depending from the main frame 56 of the conveying means 12. Each of these frame members 50 includes an upstanding member 58 at its rearward end which pivotally attaches as at 60 to the rearward end of a rod member 62 received in a socket 64 secured to and in depending relation to the conveying means 12 through suitable bracing struts 66 and 68. A set screw member 70 allows adjusted movement of the member 62 within the sleeve or socket 64 and the pivot member 60 may be located in one of several openings in the upstanding member 58. Likewise, the connection between the frame member 50 and the hanger 54 is achieved by a suitable bolt 72 which may be disposed in one of several vertically spaced openings in the hanger 54. This manner of interconnecting the frame member 50 with the frame structure of the conveying means 12 allows each reel assembly to be adjusted within limits relative to the rearward discharge region of the conveying means 12 with which it is associated.

Figure 4:
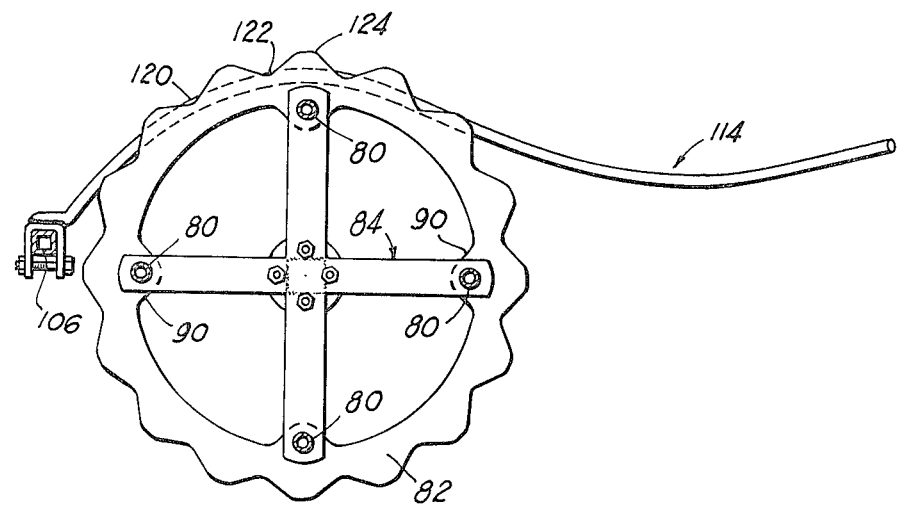
FIG. 4 is a cross-sectional view of one of the inverting assemblies.
Figure 5:
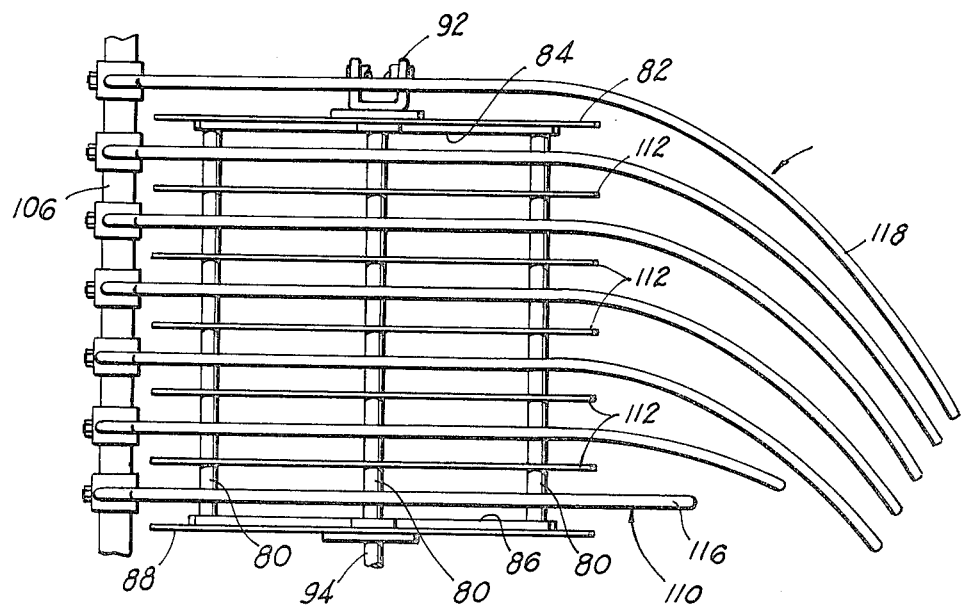
FIG. 5 is a plan view of the assembly shown in FIG. 4.

The construction of each reel assembly will be more readily apparent from a study of FIGS. 4 and 5. In these Figures, it will be seen that each reel assembly comprises a series of spaced, annular discs joined together through the intermediary of a plurality of rod or bar elements 80. The outermost disc 82 of each reel assembly is provided with a cross-like spider assembly 84 and a similar spider assembly 86 is associated with the innermost disc 88 of each reel assembly and the four rods or bars 80 rigidly join these two spider assemblies 84 and 86 and the rods or bars 80 pass through apertures disposed in the inner protrusions 90 of the associated set of discs.

Figure 2:
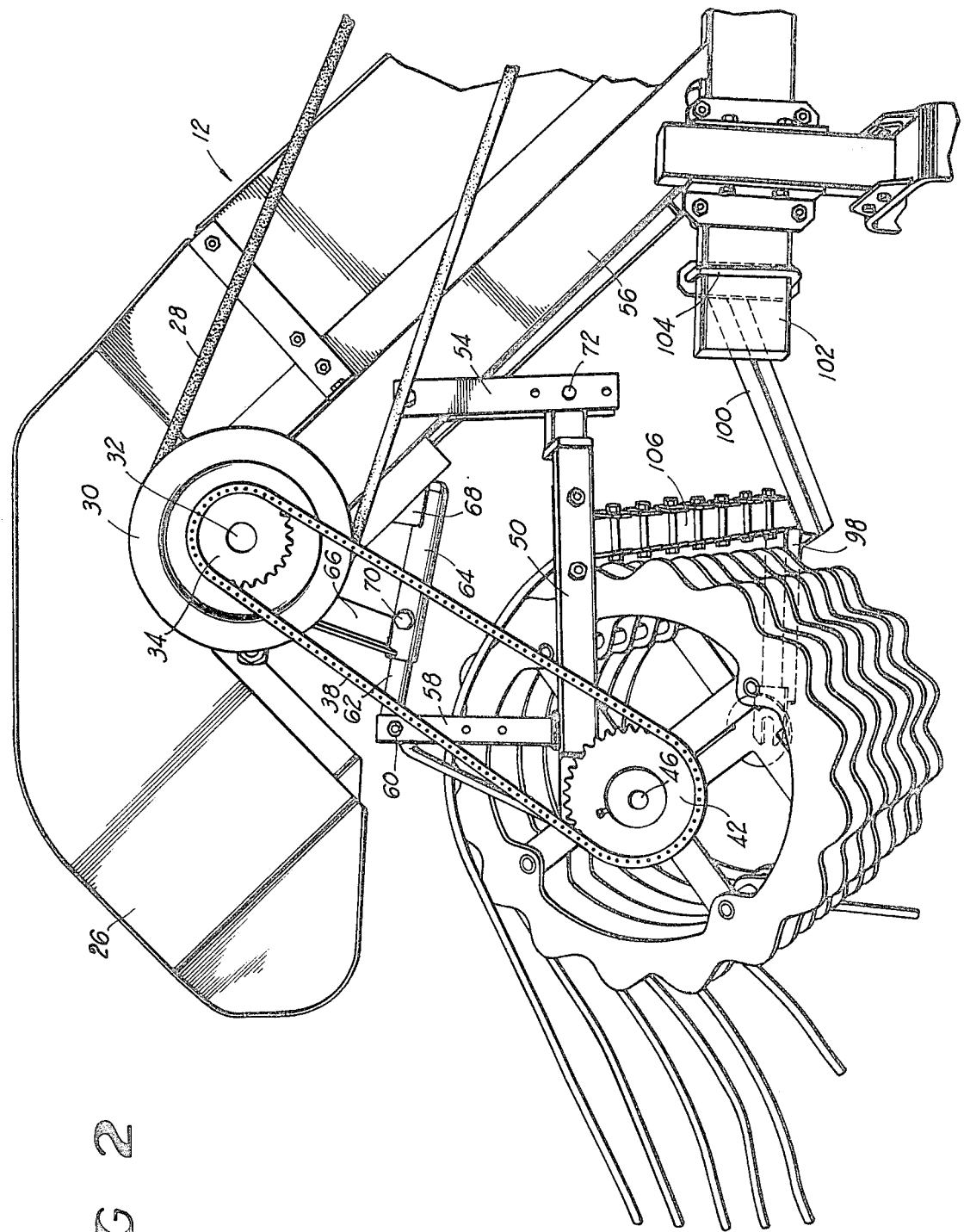
FIG. 2 is a side elevational view of the rear portion of the machine shown in FIG. 1.
Figure 3:
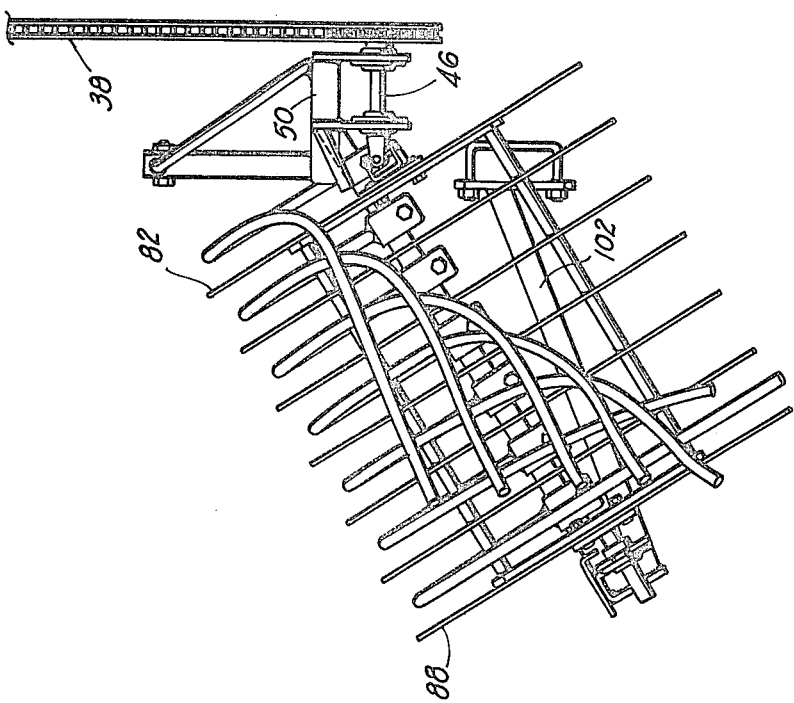
FIG. 3 is a rear elevational view of the machine showing only the inverting section thereof.
Figure 3:
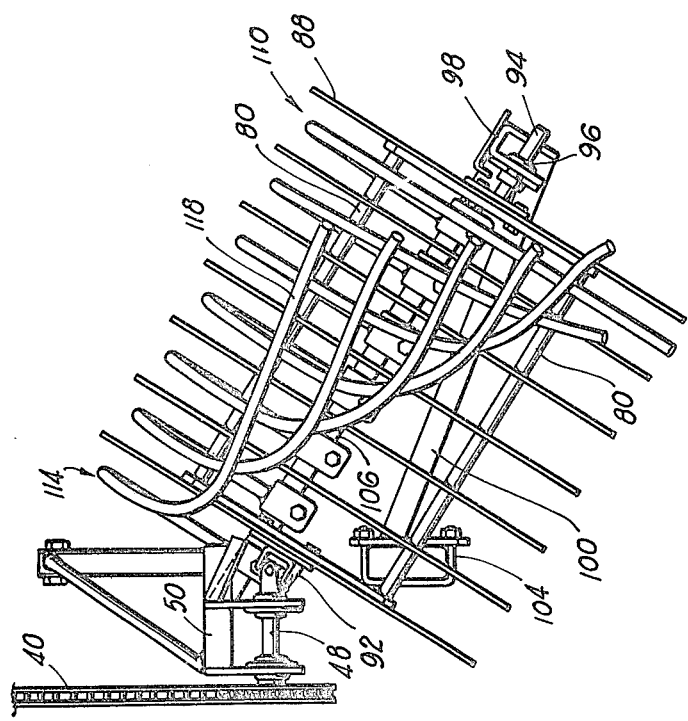

Attached to that spider assembly 84 at the outer side of each reel assembly is a universal joint member 92 which forms part of the universal joint connecting the reel assembly to its respective stub shaft 46 or 48, see particularly FIG. 3. Attached to the spider assembly at the inner side of each reel assembly is a stub shaft 94 which serves to cooperate with a bearing 96 to support the inboard end of each reel assembly, as is shown more clearly in FIG. 3. The bearing 96 in each case is carried by a frame assembly 98 which includes the brace member 100 which extends to the frame extension 102 at the associated side of the machine, see particularly FIG. 2. The frame member 100 in each case is provided with a U bolt clamping member 104 by means of which the frame assembly 98,100 may be adjusted fore and aft relative to the frame extension 102 of the conveying means 12 whereby selectively to position the inboard or inner end of each reel assembly. The frame assembly 98, 100 is joined to the frame 50 in each case by a cross frame member 106, as shown in FIG. 2, the frame member 106 serving not only to cross brace the entire assemblage but also to serve as a mounting platform for the tine set of the associated reel assembly.

As can be seen in FIGS. 4 and 5, the set of tines in each case is removably secured to the relevant cross frame member 106. The innermost tine 110 is positioned to extend between the innermost disc 88 and the next adjacent one of the intermediate discs 112 and the outermost tine 114 is disposed outboard of the outer disc 82, as is shown in FIG. 5, with the remaining tines of the set being interposed such that each adjacent pair of tines straddles one of the discs, as shown.

Each tine has a trailing end portion which travels behind its respective reel assemblies. This trailing end portion of the innermost tine 110 is indicated by the reference character 116 and as will be seen from FIG. 3, this portion of the innermost tine 110 extends substantially vertically downwardly from the reel assembly. The outermost tine 114, on the other hand, has a trailing end portion 118 which is disposed generally horizontally and also extends laterally inwardly as will also be seen from FIG. 3. The intermediate tines of each set progressively bend downwardly and extend laterally progressively to lesser degrees as will be evident in FIG. 3 such that the free ends of all of the tines lie substantially in a common generally vertical plane and with the spacing between the two reel assemblies and their associated tines being such that the tines define between them a windrow-forming region whereat the two rows of plants are crowded together into a single compact windrow with the foliage disposed lowermost and the root system being disposed uppermost and at the upper side of the windrow.

Each tine also includes a mounting end portion as is illustrated in FIG. 4, such mounting end portion in each case extending rearwardly from the region of the support frame member 106 upwardly and over the associated reel assembly with such mounting end portion 120 being curved similarly to the curvature of the discs and located at the level of or substantially opposite to the valleys 122 of the undulated periphery of each disc. The undulations form alternate peaks 124 and valleys 122 as is illustrated in FIG. 4 and, as will be seen from FIG. 2, the sizes of the sprockets 34 and 42 are very nearly the same so that each reel assembly is rotating at substantially the same angular velocity as is the main drive shaft 32 of the conveying means 12. Thus, because the individual discs are of relatively large diameter, they are driven at a relatively high rate of linear velocity so that the crop when it is discharged onto a reel assembly, and supported by the tine set thereof, will be bumped and agitated as the discs rotate and sweep past the so-supported crop rows. There is of course a net feeding action of the crop along the tine sets so that ultimately the plants are discharged in inverted fashion into the single windrow. At the same time, the locations of the mounting end portions 120 of the tines adjacent the region of the valleys 122 allows a gentle but very effective bumping and agitating action to occur on the plants while they are in the region in which they can be directly contacted by the discs. In consequence, an appreciable degree of shaking or cleaning action of the crop is effected, as needed, by the inverting section of the machine or apparatus but due to the detailed disposition of the component parts as described hereinabove, this action is not so violent or forceful as will significantly cause peanuts to be separated or dislodged from the plants and thus fall to the ground where they cannot be harvested. Each reel assembly is of squirrel cage form so as to be completely open and to allow the free passage of dirt and debris from the plants without tending to cause any clogging action. At the same time, the undulations forming the peaks and valleys 122 and 124 of each disc do not present protrusions or fingers which can become entangled with the foliage, grass or other vegetation as also would tend to cause clogging of this section of the machine and thereby detract from the inverting action otherwise attained. The discs are all of the same size and are disposed such that their peaks and valleys are aligned whereby to provide a uniform and concerted feeding action of the plants along the inverting support path afforded by the tine sets.

What is claimed is:

1. In a root crop harvesting apparatus of the type having digging means operatively associated with the harvesting apparatus for digging and removing adjacent rows of root crop plants from their growing implantation in the ground, and conveying means operatively associated with the harvesting apparatus for conveying the rows of root crop plants removed by said digging means upwardly along upwardly inclined, spaced paths to elevated discharge regions while separating soil from the roots of the plants, the improvement which comprises a pair of open, reel-like structures disposed beneath said conveying means with one of the structures below one discharge region and the other structure below the other discharge region, and a set of trailing tine elements associated with each reel-like structure for supporting the respective rows of plants and crowding such rows together into a single windrow wherein the plants are inverted so that the plant foliage engages the ground and the roots are disposed uppermost in exposed relation; each reel-like structure comprising a series of spaced, annular discs having outer peripheral edges of undulating form and a series of circumferentially spaced rods extending between said discs adjacent the outer peripheries of said discs; means rotatably supporting said reel-like structures solely at their ends for rotation about downwardly and inwardly inclined axes thereby providing completely open central cores within said reel-like structures free of any interior obstructions between their ends with the inner ends of such structures being spaced apart; each set of tines including an outermost tine having a trailing end portion extending generally horizontally and laterally inwardly, an innermost tine having a trailing end portion extending generally vertically downwardly, and intermediate tines having trailing end portions which extend progressively from generally horizontally to generally vertically and in decreasing laterally directed fashion from said outermost tine to said innermost tine such that the tines of each set terminate essentially in a generally vertical plane to define a windrow-forming region between the set of tines, adjacent tines being in straddling relation to one of said discs and each tine having a mounting end portion which extends rearwardly from the front side of said reel-like structure above said circumferentially spaced rods and curves similarly to the disc with which it is associated and is disposed approximately at the level of the valleys of the undulated periphery of such disc to merge smoothly into its trailing end portion; and means for rotating said reel-like structures to urge the plants rearwardly along said tines while bumping and shaking those plants supported by said mounting end portions of the tines, each of said open reel-type structures extending along substantially half the length of its associated set of tines so as to subject the unearthed root crop to an extended cleaning action during the inversion process.

2. In the root crop harvesting apparatus as defined in claim 1 wherein said discs are of the same size.

3. In the root crop harvesting device as defined in claim 2 wherein each reel-like structure includes a spider connected to the opposite end discs of the structure.

4. In a root crop harvesting apparatus having digging means for digging root crop plants from their growing implantation in the ground, shaker-conveyor means receiving said plants for shaking them to remove debris while conveying them to elevated discharge disposition, and inverter means intercepting the discharged plants from the shaker-conveyor means for directing them in inverted position in a windrow behind the apparatus, the improvement wherein said inverter means comprises an open, reellike structure including a series of spaced discs having undulated peripheries journaled for rotation solely at its ends and a series of circumferentially spaced rods extending between said discs thereby providing a completely open central core within said reel-type structure free of any interior obstructions between its ends, and a set of tines operatively associated with said discs to support the plants as they pass above said circumferentially spaced rods and are gently agitated and bumped by the undulations while being fed along the tines of the tine set, said open reel-type structure subjecting the unearthed root crop to an extended cleaning action during the inversion process.

5. In an apparatus as defined in claim 4 wherein each tine includes a portion passing over the reel-like structure to one side of a disc, such portion of each tine being aligned opposite the valleys provided by the disc undulations.

6. In a root crop harvesting apparatus having digging means for digging root crop plants from their growing implantation in the ground, shaker-conveyor means receiving said plants for shaking them to remove debris while conveying them to elevated discharge disposition, and inverter means intercepting the discharged plants from the shaker-conveyor means for directing them in inverted position in a windrow behind the apparatus, the improvement wherein said inverter means comprises a pair of open-like structures including a series of spaced discs having interrupted peripheries, means for rotating said open-like structures solely at their ends about downwardly inwardly inclined axes thereby providing completely open central cores within said reel-type structures free of any interior obstructions between their ends, and a set of tines operatively associated with each of said open-like structures and positioned below said interrupted peripheries of said disc to support the plants as they pass over and are gently agitated and bumped by the interrupted peripheries of said disc while being urged along the tines of the tine set, each of said open-type structures extending along a substantial length of its associated set of tines so as to subject the unearthed root crop to an additional and extended cleaning action during the inversion process.

* * * * *